A memory system may include: a nonvolatile memory; a volatile memory; and a controller suitable for repeatedly entering and exiting from an automatic exclusive mode for each predetermined size of write data transferred from the host in a start period of the automatic exclusive mode, and allocating the volatile memory exclusively for performing a merge operation on the nonvolatile memory during an entry period of the automatic exclusive mode, the controller may include a command queue for storing plural commands transferred from the host, may use a predetermined operation in the start period of the automatic exclusive mode to calculate a processing time of write commands among the commands stored in the command queue and an entry time of the entry period of the automatic exclusive mode, and may schedule a processing order of the commands stored in the command queue according to the calculation result.

22 Claims, 11 Drawing Sheets

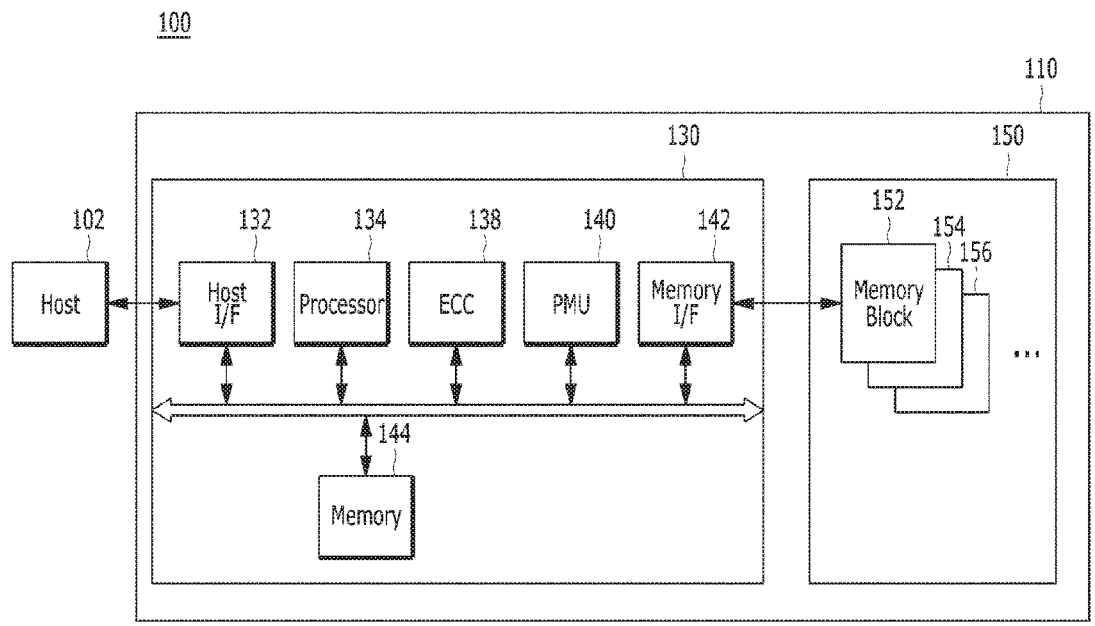

(56) References Cited

U.S. PATENT DOCUMENTS

| | | | |
|---|---|---|---|
| 2014/0215129 A1 | 7/2014 | Kuzmin et al. | |
| 2014/0281736 A1* | 9/2014 | Kong | G11C 29/52 |
| | | | 714/42 |
| 2014/0325122 A1* | 10/2014 | Kim | G06F 1/206 |
| | | | 711/103 |
| 2015/0323975 A1* | 11/2015 | Ambapuram | G06F 1/3243 |
| | | | 710/308 |
| 2016/0283150 A1* | 9/2016 | Kogita | G06F 11/1048 |
| 2017/0052859 A1* | 2/2017 | Scouller | G06F 3/0685 |

* cited by examiner

MEMORY SYSTEM AND OPERATION METHOD THEREOF

CROSS-REFERENCE TO RELATED APPLICATION

This application claims priority under 35 U.S.C. § 119 to Korean Patent Application No. 10-2018-0031941 filed on Mar. 20, 2018, which is incorporated herein by reference in its entirety.

BACKGROUND

1. Field

Various embodiments of the present invention generally relate to a memory system. Particularly, the embodiments relate to a memory system which supports a merge operation and command scheduling operation, and an operation method thereof.

2. Discussion of the Related Art

The computer environment paradigm has changed to ubiquitous computing that allows computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts (e.g., a mechanical arm with a read/write head) as compared with a hard disk device. Examples of memory systems having such advantages include universal serial bus (USB) memory devices, memory cards having various interfaces, and solid state drives (SSD).

SUMMARY

Various embodiments are directed to a memory system capable of improving or maximizing the performance of a merge operation, and avoiding a timeout of a normal command requested from a host during the merge operation, and an operation method thereof.

In an embodiment, a memory system may include: a nonvolatile memory comprising a plurality of memory blocks each having a plurality of pages; a volatile memory suitable for temporarily storing data which are transferred between a host and the nonvolatile memory; and a controller suitable for repeatedly entering and exiting from an automatic exclusive mode for each predetermined size of write data transferred from the host in a start period of the automatic exclusive mode, and allocating the volatile memory exclusively for performing a merge operation on the nonvolatile memory during an entry period of the automatic exclusive mode, the controller may include a command queue for storing plural commands transferred from the host, may use a predetermined operation in the start period of the automatic exclusive mode to calculate a processing time of write commands among the commands stored in the command queue and an entry time of the entry period of the automatic exclusive mode, and may schedule a processing order of the commands stored in the command queue according to the calculation result.

The controller may select whether to start or end the automatic exclusive mode in response to a result obtained by checking the state of the nonvolatile memory, may enter the automatic exclusive mode when the write data corresponding to the write commands stored in the command queue are written by the preset size to the nonvolatile memory at an exit period of the automatic exclusive mode in the start period of the automatic exclusive mode, and may exit from the automatic exclusive mode at a time point when a preset time has elapsed from the entry point of the automatic exclusive mode.

The memory system may further include an information storage suitable for storing first information on the start and end states of the automatic exclusive mode, second information on the entry and exit states of the automatic exclusive mode and the preset size, and third information on the preset time.

The controller may include: a host controller comprising the command queue, and suitable for processing an operation between the host and the host controller; a memory controller coupled to the host controller, and suitable for processing an operation between the nonvolatile memory and the memory controller, and the host controller may calculate the processing time and the entry time using the preset operation in the start period of the automatic exclusive mode, and then may schedule the processing order of the commands stored in the command queue according to the calculation result.

The host controller may check the first to third information of the information storage, in the start period of the automatic exclusive mode, recognized through the check result, the host controller may compare the preset size recognized through the check result, to an entire size of the write data corresponding to the write commands stored in the command queue, may calculate the number of entries going into and exiting from the automatic exclusive mode, which is required to process the write commands stored in the command queue, as a processing number according to the comparison result, and may calculate the processing time by multiplying the processing number by a time required for writing the preset size of write data to the nonvolatile memory.

The host controller may check the first to third information of the information storage, in the start period of the automatic exclusive mode, recognized through the check result, the host controller may calculate the entry time by multiplying the preset time recognized through the check result by the processing number.

The host controller may check the first to third information of the information storage, in the start period of the automatic exclusive mode, recognized through the check result, the host controller may calculate a write time by adding the processing time and the entry time, may calculate an available processing time of other commands except the write commands among the commands stored in the command queue by subtracting the write time from a timeout time of the write commands stored in the command queue, may preferentially process the other commands stored in the command queue until the available processing time, and then may preferentially process the write commands stored in the command queue.

The host controller may check the first to third information of the information storage, may inform the host of a switch of the memory system to a busy state in response to the entry into the automatic exclusive mode, recognized through the check result, and may inform the host of a switch of the memory system to a ready state in response to the exit from the automatic exclusive mode, recognized through the check result.

The memory controller may adjust the information on whether to start or end the automatic exclusive mode and the entry or exit points of the automatic exclusive mode by adjusting the first to third information of the information storage in response to the result obtained by checking the state of the nonvolatile memory.

The memory controller may check the first to third information of the information storage, may write the write data to the nonvolatile memory according to a request of the host controller at the exit period of the automatic exclusive mode in the start period of the automatic exclusive mode, recognized through the check result, may enter the automatic exclusive mode by adjusting the second information of the information storage when the write data corresponding to the preset size recognized through the check result are written to the nonvolatile memory, and may exit from the automatic exclusive mode by adjusting the second information of the information storage at a time point when that the preset time recognized through the check result has elapsed from the entry point of the automatic exclusive mode.

In an embodiment, an operation method of a memory system which includes a nonvolatile memory including a plurality of blocks each having a plurality of pages, a volatile memory for temporarily storing data transferred between a host and the nonvolatile memory, and a command queue for storing a plurality of commands transferred from the host, the operation method may include: repeatedly entering and exiting from an automatic exclusive mode for each predetermined size of write data which are transferred from the host and written to the nonvolatile memory, in a start period of the automatic exclusive mode; exclusively using the volatile memory to perform a merge operation on the nonvolatile memory during an entry period of the automatic exclusive mode; and calculating a processing time of write commands among the commands stored in the command queue and an entry time of the entry period of the automatic exclusive mode, using a preset operation in the start period of the automatic exclusive mode, and then scheduling a processing order of the commands stored in the command queue according to the calculation result.

The repeatedly entering the automatic exclusive mode may include: selecting whether to start or end the automatic exclusive mode in response to a result obtained by checking the state of the nonvolatile memory; entering the automatic exclusive mode when the write data corresponding to the write commands stored in the command queue are written by the preset size to the nonvolatile memory at an exit period of the automatic exclusive mode in the start period of the automatic exclusive mode, and exiting from the automatic exclusive mode at a time point when that a preset time has elapsed from the entry point of the automatic exclusive mode.

The memory system may further include an information storage suitable for storing first information on the start and end states of the automatic exclusive mode, second information on the entry and exit states of the automatic exclusive mode and the preset size, and third information on the preset time.

The memory system may further include a host controller suitable for processing an operation between the host and the host controller and a memory controller coupled to the host controller and suitable for processing an operation between the nonvolatile memory and the memory controller, and the operation processing step may include calculating the processing time and the entry time using the preset operation through the host controller in the start period of the automatic exclusive mode, and scheduling the processing order of the commands stored in the command queue according to the calculation result.

The calculating the processing time may include a first check step in which the host controller checks the first to third information of the information storage, when it is checked through the first check step that the host controller is in the start period of the automatic exclusive mode, the calculating the processing time may further include: a first comparison step in which the host controller compares the preset size recognized through the first check step to an entire size of the write data corresponding to the write commands stored in the command queue; a first calculation step in which the host controller calculates the number of entries going into and exiting from the automatic exclusive mode, which is required for processing the write commands stored in the command queue, as a processing number according to the result of the first comparison step; and a second calculation step in which the host controller calculates the processing time by multiplying the processing number by a time required for writing the preset size of write data to the nonvolatile memory.

The calculating the processing time may further include a third calculation step in which the host controller calculates the entry time by multiplying the preset time recognized through the first check step by the processing number, when it is checked through the first check step that the host controller is in the start period of the automatic exclusive mode.

The calculating the processing time may include: a fourth calculation step in which the host controller calculates a write time by adding the processing time and the entry time, when it is checked at the first check step that the host controller is in the start period of the automatic exclusive mode; a fifth calculation step in which the host controller calculates an available processing time of the other commands except the write commands among the commands stored in the command queue by subtracting the write time from a timeout time of the write commands stored in the command queue; and a processing step in which the host controller preferentially processes the other commands stored in the command queue until the available processing time, and then preferentially processes the write commands stored in the command queue.

The repeatedly entering the automatic exclusive mode may include: a second check step in which the host controller checks the first to third information of the information storage; a first informing step in which the host controller informs the host of a switch of the memory system to a busy state in response to an entry of the automatic exclusive mode, recognized through the second check state; and a second informing step in which the host controller informs the host of a switch of the memory system to a ready state in response to an exit of the automatic exclusive mode, recognized through the second check state.

The repeatedly entering the automatic exclusive mode may include: a third check step in which the memory controller checks the state of the nonvolatile memory; and an adjusting step in which the memory controller adjusts the information on whether to start or end the automatic exclusive mode and the entry or exit points of the automatic exclusive mode by adjusting the first to third information of the information storage in response to the result of the third check step.

The repeatedly entering the automatic exclusive mode may further include a fourth check step in which the memory controller checks the first to third information of the information storage, the entry step may include: writing, by the memory controller, the write data to the nonvolatile memory according to a write request transferred to the memory controller from the host controller at an exit period of the automatic exclusive mode in the start period of the automatic exclusive mode, recognized through the result of the fourth check step; and entering, by the memory controller, the automatic exclusive mode by adjusting the second information of the information storage when the memory controller writes the write data corresponding to the preset size recognized through the result of the fourth check step to the nonvolatile memory, and in the exit step, the memory controller may exit from the automatic exclusive mode by adjusting the second information of the information storage at a time point when the preset time recognized through the result of the fourth check step has elapsed from the entry point of the automatic exclusive mode.

In an embodiment, a memory system may include: a nonvolatile memory comprising a plurality of memory blocks, each having a plurality of pages; a volatile memory suitable for temporarily storing data which are transferred between a host and the nonvolatile memory; and a controller comprising a command queue for storing a plurality of commands entered from the host, a volatile memory used for performing a merge operation during an entry period of the automatic exclusive mode, and at least one buffer used for re-scheduling a processing order of the plurality of commands stored in the command queue, a controller may be suitable for storing a write data entered from a host into the volatile memory, dividing the write data by a predetermined size, carrying out and stopping an automatic exclusive mode for each predetermined size of write data.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
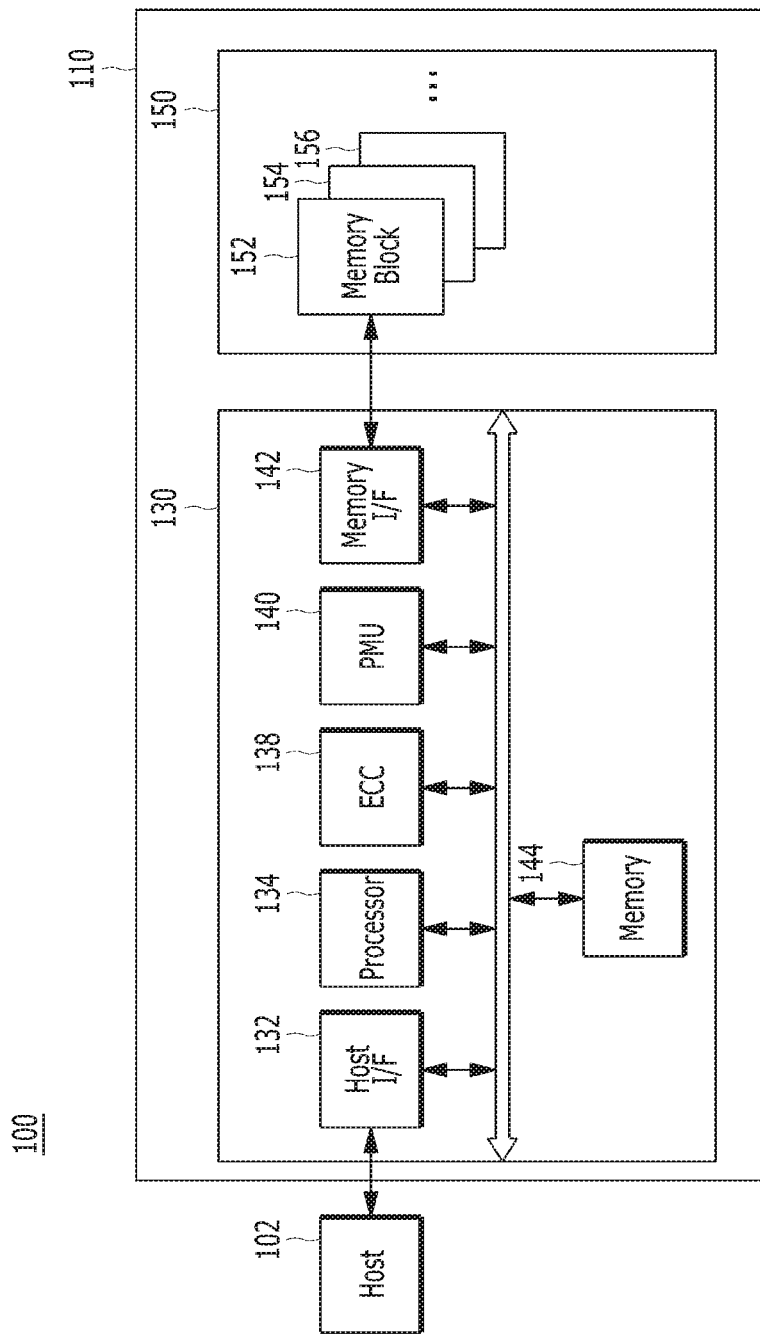
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention. It is noted that reference to "an embodiment" does not necessarily mean only one embodiment, and different references to "an embodiment" are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for describing particular embodiments only and is not intended to be limiting of the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the disclosure. It will be further understood that terms, such as those defined in commonly used dictionaries, should be interpreted as having a meaning that is consistent with their meaning in the context of the disclosure and the relevant art and will not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 is a block diagram illustrating a data processing system 100 including a memory system 110 in accordance with an embodiment of the invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, a game machine, a TV and a projector.

The memory system 110 may operate to store data for the host 102 in response to a request of the host 102. Non-limiting examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limiting examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory. The flash memory may have a 3-dimensional (3D) stack structure.

The memory system 110 may include a memory device 150 and a controller 130. The memory device 150 may store data for the host 120. The controller 130 may control data storage into the memory device 150.

The controller 130 and the memory device 150 may be integrated into a single semiconductor device, which may be included in the various types of memory systems as exemplified above.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation. The memory device 150 may provide data stored therein to the host 102 through a read operation. The memory device 150 may include a plurality of memory dies (not shown), each memory die including a plurality of planes (not shown), each plane including a plurality of memory blocks 152 to 156. Each of the memory blocks 152 to 156 may include a plurality of pages. Each of the pages may include a plurality of memory cells coupled to a word line.

The controller 130 may control the memory device 150 in response to a request from the host 102. By way of example and not limitation, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a memory interface 142 such as a NAND flash controller (NFC), and a memory 144. Each of components may be electrically coupled, or engaged with, each other via an internal bus.

The host interface 132 may be configured to process a command and data of the host 102, and may communicate with the host 102 under one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success or fail signal. When the number of error bits is more than a threshold value of correctable error bits, the ECC component 138 may not correct the error bits to output the error correction fail signal.

The ECC component 138 may perform error correction through a coded modulation such as Low Density Parity Check (LDDC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited thereto. The ECC component 138 may include all circuits, modules, systems or devices for error correction.

The PMU 140 may manage an electrical power used and provided in the controller 130.

The memory interface 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory interface 142 may generate a control signal for the memory device 150 to process data entered into the memory device 150 by the processor 134. The memory interface 142 may work as an interface (e.g., a NAND flash interface) for processing a command and data between the controller 130 and the memory device 150. Specifically, the memory interface 142 may support data transfer between the controller 130 and the memory device 150.

The memory 144 may serve as a working memory of the memory system 110 and the controller 130. The memory 144 may store data supporting operation of the memory system 110 and the controller 130. The controller 130 may control the memory device 150 so that read, write, program and erase operations are performed in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be embodied by a volatile memory. By way of example and not limitation, the memory 144 may be embodied by static random access memory (SRAM) or dynamic random access memory (DRAM). The memory 144 may be disposed within or out of the controller 130. FIG. 1 describes an example of the memory 144 disposed within the controller 130. In another embodiment, the memory 144 may be embodied by an external volatile memory having a memory interface 142 transferring data between the memory 144 and the controller 130.

The processor 134 may control the overall operations of the memory system 110. The processor 134 may use a firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block among the plurality of memory blocks 152 to 156 included in the memory device 150. The bad block may include a block where a program fail occurs during a program operation, due to the characteristics of a NAND flash memory. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
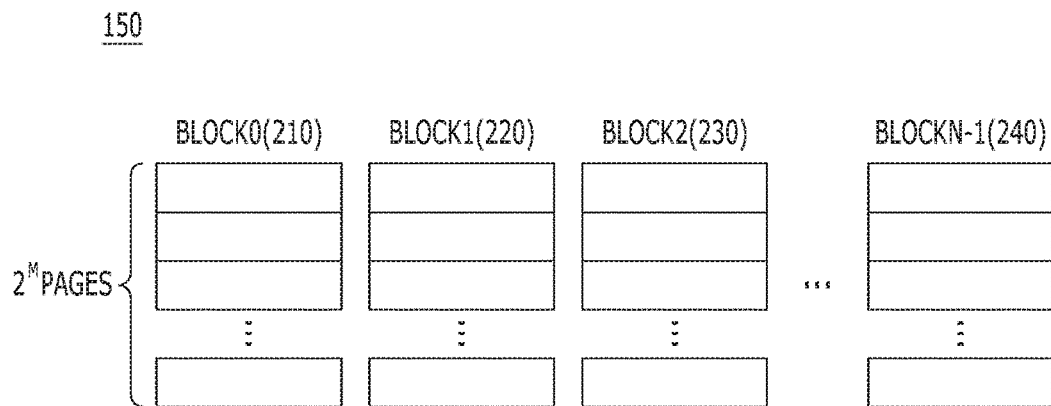
FIG. 2 is a schematic diagram illustrating a configuration of a memory device employed in the memory system shown in FIG. 1.

FIG. 2 is a schematic diagram illustrating the memory device 150 shown in FIG. 1.

Referring to FIG. 2, the memory device 150 may include a plurality of memory blocks BLOCK0 to BLOCKN−1, and each of the blocks BLOCK0 to BLOCKN−1 may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
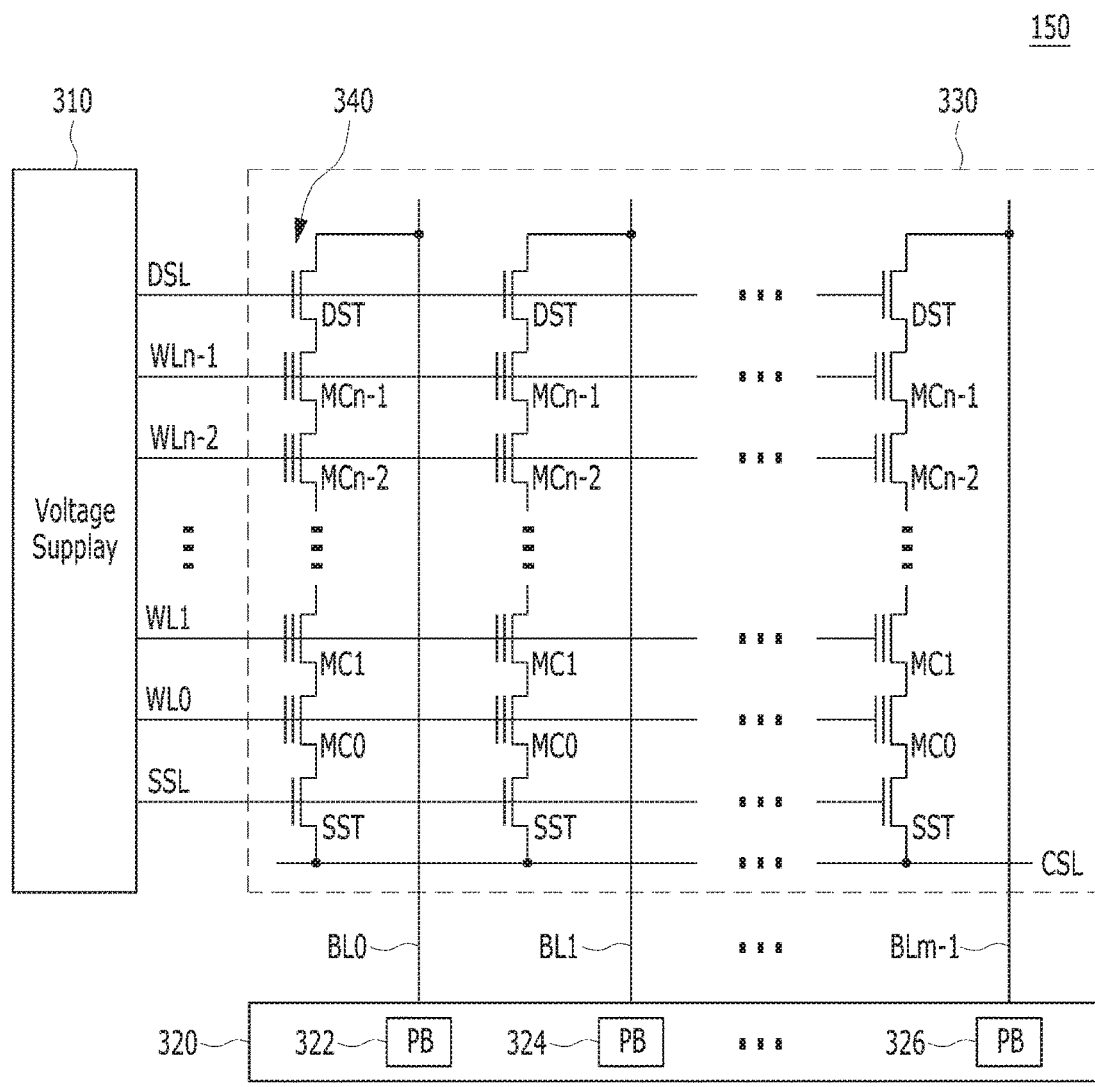
FIG. 3 is a circuit diagram illustrating a configuration of a memory cell array of a memory block in the memory device shown in FIG. 2.

FIG. 3 is a circuit diagram illustrating a configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST, SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1. For reference, in FIG. 3, 'DSL' denotes a drain select line, 'SSL' denotes a source select line, and 'CSL' denotes a common source line. A plurality of world lines WL0 to WLn−1 may be coupled in series between the select source line SSL and the drain source line DSL.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write circuit (read/write) 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and may supply a current or a voltage onto bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
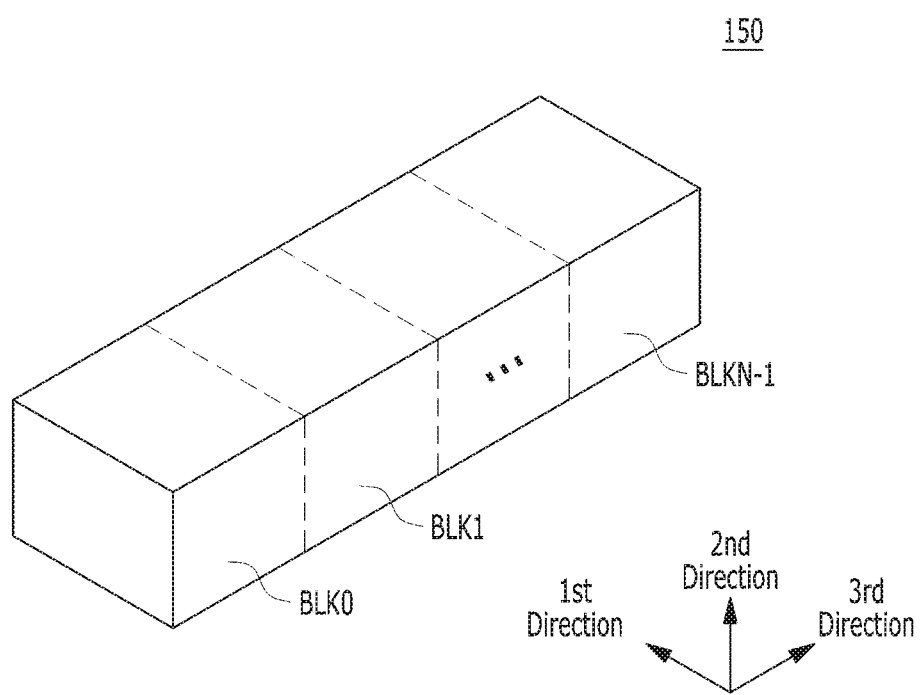
FIG. 4 is a schematic diagram illustrating a three-dimensional (3D) structure of the memory device shown in FIG. 2.

FIG. 4 is a schematic diagram illustrating a three-dimensional (3D) structure of the memory device 150 shown in FIGS. 1 to 3.

The memory device 150 may be embodied by a two-dimensional (2D) or a 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure). The plurality of memory blocks BLK0 to BLKN-1 may correspond to the memory blocks BLOCK0 to BLOCKN-1 shown in FIG. 2.

Hereinbelow, detailed descriptions will be made with reference to FIGS. 5 to 8, for data processing with respect to the memory device 150 in a memory system in accordance with an embodiment, particularly, a data processing operation when performing a command operation corresponding to a command received from the host 102 and a data management operation.

Figure 5:
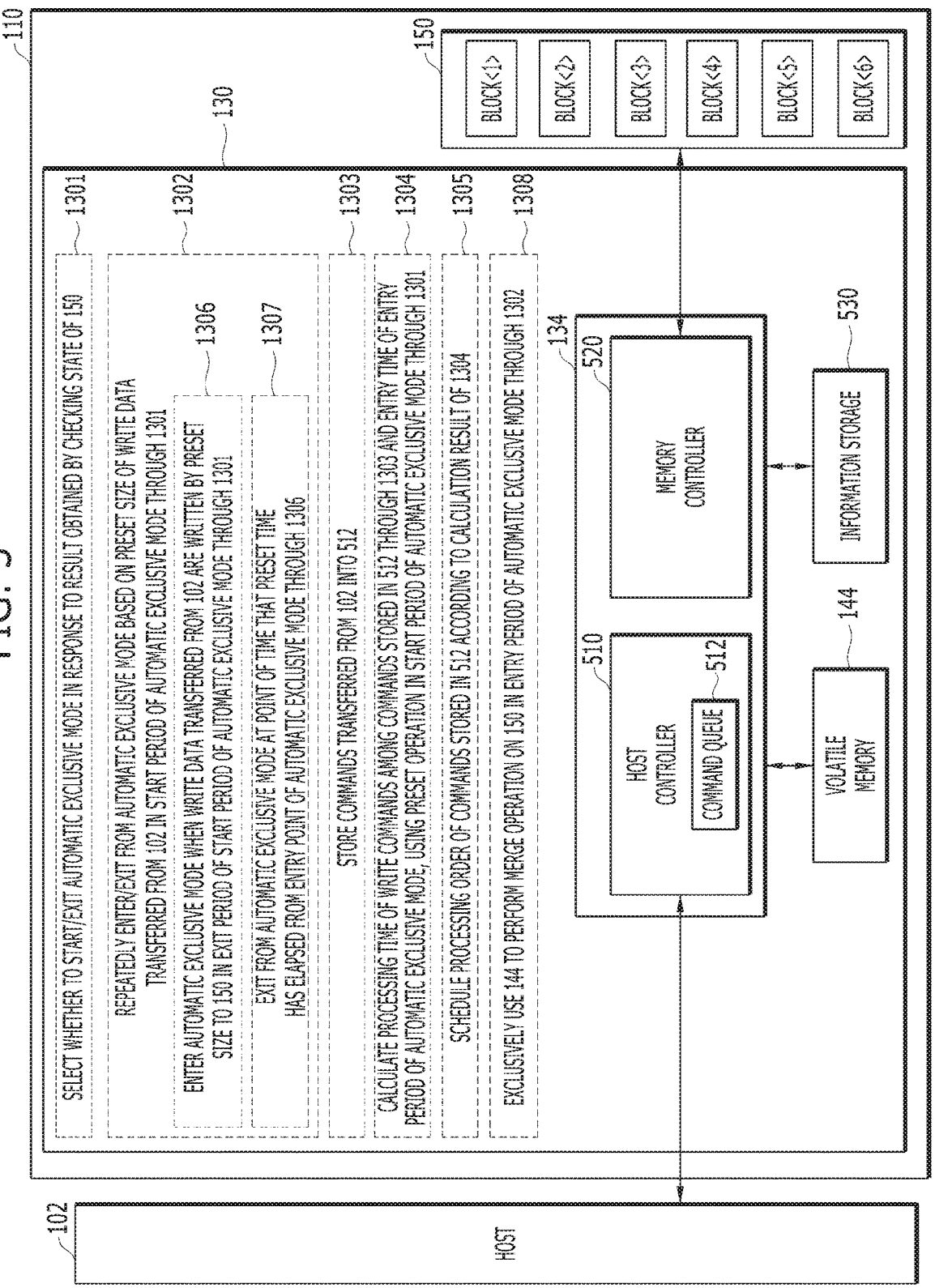
FIGS. 5 to 7 are diagrams describing a memory system in accordance with an embodiment.
Figure 6:
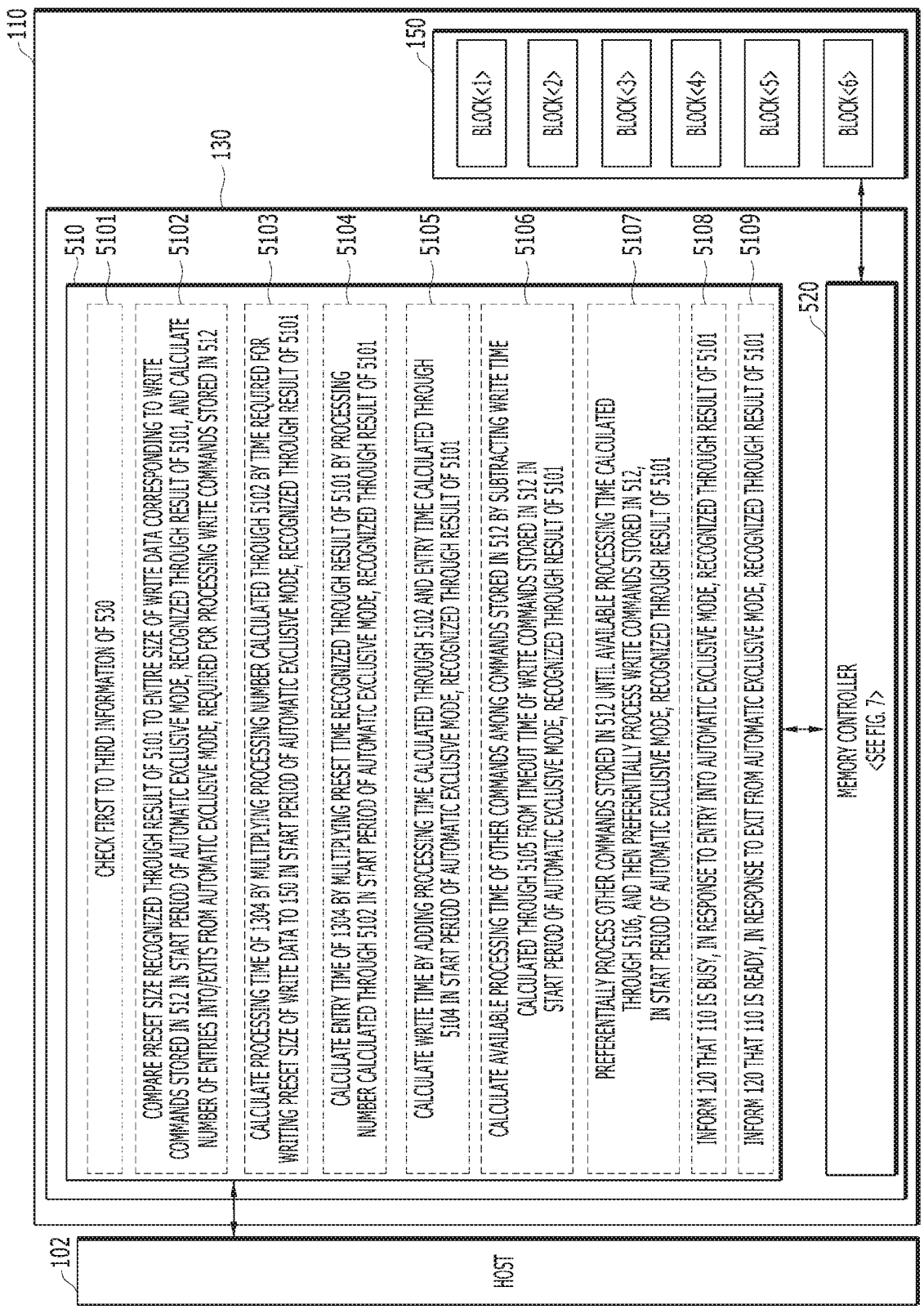
Figure 7:
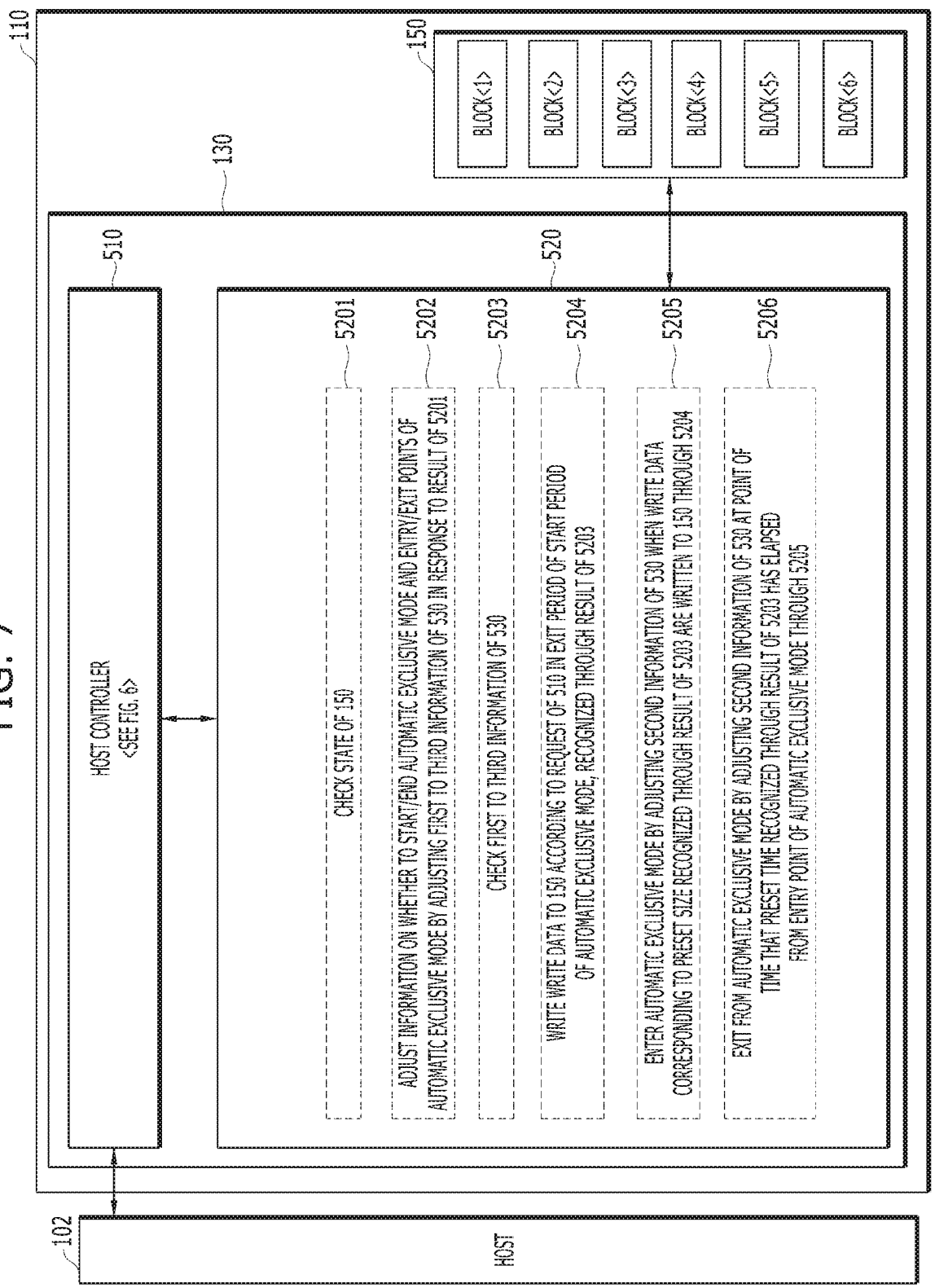

FIGS. 5 to 7 are diagrams describing an operation of a memory system 110 in accordance with an embodiment.

FIGS. 5 to 7 illustrate a configuration of a data processing system 100 including a host 102 and a memory system 110 with reference to the configuration of the data processing system 100 illustrated in FIG. 1.

As described with reference to FIG. 1, the memory system 110 may include a controller 130 and a nonvolatile memory 150.

The controller 130 may include a processor 134, a volatile memory 144 and an information storage 530. The processor 134 may include a host controller 510 and a memory controller 520. The host controller 510 may include a command queue 512.

The nonvolatile memory 150 may include a plurality of memory blocks BLOCK<1:6>. The plurality of memory blocks <1:6> may correspond to the memory blocks 152 to 156 described in FIG. 1. At this time, each of the memory blocks BLOCK<1:6> may include a plurality of pages as described with reference to FIG. 2.

Although FIGS. 5 to 7 illustrate that the memory system 110 includes only one nonvolatile memory 150, the present invention is not limited thereto. That is, this configuration is only an example for convenience of description, and a larger number of nonvolatile memories may be included in the memory system 110. Furthermore, although FIGS. 5 to 7 illustrate that the nonvolatile memory 150 includes six memory blocks BLOCK<1:6>, the present invention is not limited thereto. That is, this configuration is only an example for convenience of description, and the number of memory blocks included in the nonvolatile memory 150 may vary depending on design.

While FIG. 1 illustrates that the host interface 132, the ECC component 138, the power management unit 140, and the memory interface 142 are included in the controller 130, FIGS. 5 to 7 illustrate only some of the components included in the controller 130. However, those components are only omitted for convenience of description, and may be actually included in the controller 130.

The volatile memory 144 may temporarily store data transferred between the host 102 and the nonvolatile memory 150. At this time, the volatile memory 144 may correspond to the memory 144 described with reference to FIG. 1. Although FIG. 5 illustrates that the volatile memory 144 is included in the controller 130, the present invention is not limited thereto. That is, the volatile memory 144 may be installed outside the controller 130 in the memory system 110.

The controller 130 may select whether to start/end an automatic exclusive mode in response to a result obtained by checking the state of the nonvolatile memory 150, at operation 1301. Herein, the automatic exclusive mode may support that the controller 130 may temporarily suspend or halt carrying out a request entered from the host 102 for an internal operation in the memory system 110.

When the automatic exclusive mode is starts as a result of operation 1301, that is, during a start period of the automatic exclusive mode, the controller 130 may repeatedly enter/exit from the automatic exclusive mode for every preset size of write data transferred from the host 102, at operation 1302. The controller 130 may divide the write data by a preset or predetermined size.

Specifically, at an exit period of the automatic exclusive mode in the start period of the automatic exclusive mode through operation 1301, the controller 130 in operation 1302 may re-enter the automatic exclusive mode, at operation 1306, when write data transferred from the host 102 are written by the preset size to the nonvolatile memory 150 from an escaped state where the controller 130 exits from the automatic exclusive mode at operation 1307 which will be described later.

The controller 130 in operation 1302 may exit from the automatic exclusive mode at a time point when a preset time elapses from an entry point of the automatic exclusive mode in the start period of the automatic exclusive mode through operation 1301, that is, the entry point of the automatic exclusive mode through operation 1306, at operation 1307.

The controller 130 may further include a command queue 512 for storing a plurality of commands entered from the host 102. In operation 1303, the controller 130 may store the plurality of commands entered from the host 102 in the command queue 512.

The controller 130 in operation 1306 including operation 1303 may start the automatic exclusive mode, when a write data corresponding to a write command among the commands which are transferred from the host 102 and stored in the command queue 512 is written by the preset size to the nonvolatile memory 150 during the exit period of the automatic exclusive mode in the start period of the automatic exclusive mode through operation 1301, or after the controller 130 exits from the automatic exclusive mode through operation 1307. That is, the automatic exclusive mode may be re-started, or re-entered, after a predetermined-size write data is programmed into the nonvolatile memory 150 for the escaped state, i.e., a period of ceasing or halting the automatic exclusive mode.

The controller 130 may calculate and/or estimate a processing time of the write command among the commands stored in the command queue 512 as well as an entry time of the automatic exclusive mode, using a preset operation in the start period of the automatic exclusive mode through operation 1301, at operation 1304.

The controller 130 may schedule a processing order of the commands stored in the command queue 512 according to the calculation result of operation 1304 in the start period of the automatic exclusive mode through operation 1301, at operation 1305. In order to re-schedule a processing order of the commands stored in the command queue 512, in an embodiment, the controller 130 may include at least one buffer (not shown).

At the entry period of the automatic exclusive mode through operation 1306 of operation 1302 in the start period of the automatic exclusive mode through operation 1301, the controller 130 may exclusively use the volatile memory 144 to perform a merge operation on the nonvolatile memory 150 at operation 1308.

Specifically, the controller 130 may flush data stored in the volatile memory 144 to the nonvolatile memory 150 in response to the entry into the automatic exclusive mode through operation 1306 of operation 1302 in the start period of the automatic exclusive mode through operation 1301. In this case, the controller 130 may exclusively use the entire region of the volatile memory 144 to perform the merge operation during the entry period of the automatic exclusive mode.

At this time, the operation of flushing the data stored in the volatile memory 144 to the nonvolatile memory 150 may indicate that all data stored in the volatile memory 144 are copied and stored into a preset region of the nonvolatile memory 150. After the flush operation, all data in the volatile memory 144 are no longer necessary to be retained so that the controller 130 may discard all data stored in the volatile memory 144. Then, the controller 130 may exclusively use the entire region of the volatile memory 144, which is allocated for storing data, to perform a merge operation.

Furthermore, the controller 130 may discard data updated into the nonvolatile memory 150 among the data stored in the volatile memory 144, in response to the entry into the automatic exclusive mode through operation 1306 of operation 1302 in the start period of the automatic exclusive mode through operation 1301.

In this case, the controller 130 may exclusively use a region covering more than a designated region for a general merge operation in the volatile memory 144, to perform the merge operation during the entry period of the automatic exclusive mode.

As described above with reference to FIG. 1, the volatile memory 144 can be used for various uses, for example, a write buffer/cache, a read buffer/cache, and a map buffer/cache. Therefore, the internal storage space of the volatile memory 144 may be divided into various regions depending on the uses. Thus, a part of the internal storage region of the volatile memory 144 may be previously designated for a merge operation.

At this time, the controller 130 in accordance with the present embodiment may discard data updated into the nonvolatile memory 150 among data stored in a region which is not designated for a merge operation in the storage space of the volatile memory 144, in response to the entry into the automatic exclusive mode through operation 1306 of operation 1302. Therefore, the controller 130 in accordance with the present embodiment can exclusively use a wider region than the region designated for a general merge operation in the volatile memory 144, to perform a merge operation during the entry period of the automatic exclusive mode.

The data updated into the nonvolatile memory 150 among the data stored in the volatile memory 144 may indicate data which have been already stored into the nonvolatile memory 150 through an operation such as a checkpoint, among the data stored in the nonvolatile memory 144. For this reason, the controller 130 can discard the data updated into the nonvolatile memory 150 among the data stored in the volatile memory 144 in the entry period of the automatic exclusive mode, and then use the corresponding region for a merge operation.

The controller 130 may switch the state of the memory system 110 to a busy state and inform the host 102 of the switched state, in response to the entry into the automatic exclusive mode through operation 1306 of operation 1302 in the start period of the automatic exclusive mode through operation 1301.

Since the host 102 recognizes through the operation of the controller 130 that the memory system 110 is busy, the controller 130 may not receive an arbitrary request such as a read request or a write request entered from the host 102 for the entry or start period of the automatic exclusive mode through operation 1306 of operation 1302.

The controller 130 may switch the state of the memory system 110 to a ready state and inform the host 102 of the switched state (i.e., the ready state), in response to the exit from the automatic exclusive mode through operation 1307 of operation 1302 in the start period of the automatic exclusive mode through operation 1301.

Since the host 102 recognizes through the operation of the controller 130 that the memory system 110 is ready, the controller 130 may receive an arbitrary request such as a read request or a write request entered from the host 102 after exiting from the automatic exclusive mode through operation 1307 of operation 1302.

The merge operation may include an operation of merging valid data included in two or more victim memory blocks among the memory blocks BLOCK<1:6> included in the nonvolatile memory 150, and another operation of moving the merged data to a target memory block.

By way of example and not limitation, the merge operation may include a garbage collection operation, a read reclaim operation, a wear leveling operation or a map update operation. Alternatively, the merge operation may work as a partial process for the garbage collision operation, the read reclaim operation, the wear leveling operation or the map update operation.

As described above, the controller 130 may determine whether to start/end the automatic exclusive mode, according to the result obtained by checking the state of the nonvolatile memory 150, at operation 1301.

At this time, the operation of checking the state of the nonvolatile memory 150 may include an operation of checking the ratio of free memory blocks among the memory blocks BLOCK<1:6> included in the nonvolatile memory 150.

That is, to check the state of the nonvolatile memory 150, the controller 130 may check the ratio of free memory blocks among the memory blocks BLOCK<1:6> included in the nonvolatile memory 150. The controller 130 may determine whether to start/end the automatic exclusive mode according to the check result.

When the check result indicates that the ratio of free memory blocks is equal to or less than a preset ratio, the controller 130 may continuously retain the automatic exclusive mode in the case where the automatic exclusive mode was already started. The controller 130 may start the automatic exclusive mode in the case where the automatic exclusive mode was ended. Thus, the entry/exit of the automatic exclusive mode through operation 1302 may be repeated.

On the other hand, when the check result indicates that the ratio of free memory blocks exceeds the preset ratio, the controller 130 may end the automatic exclusive mode in the case where the automatic exclusive mode was already started. The controller 130 may also retain the end state of the automatic exclusive mode in the case where the automatic exclusive mode was ended. Thus, the entry/exit of the automatic exclusive mode through operation 1302 may not be repeated.

In the embodiment, the operation of checking the ratio of free memory blocks among the memory blocks BLOCK<1:6> included in the nonvolatile memory 150 may be exemplified as the operation of checking the state of the nonvolatile memory 150. However, this is only an example, and the state of the nonvolatile memory 150 can be checked through another method.

The information storage 530 may store first information corresponding to operation 1301 of the controller 130 as well as second and third information corresponding to operation 1302 of the controller 130.

The first information may contain information indicating whether the automatic exclusive mode was started or ended through operation 1301 of the controller 130.

The second information may contain information on 'preset size' used as an entry condition of the automatic exclusive mode in operation 1306 of operation 1302, and the information indicating whether the controller 130 entered or exited from the automatic exclusive mode through operation 1302.

The third information may contain information on 'preset time' of the automatic exclusive mode, which indicates at which point the controller 130 will exit from the automatic exclusive mode through operation 1307 of operation 1302, after entering the automatic exclusive mode through operation 1306 of operation 1302, regarding the automatic exclusive mode started through operation 1301 of the controller 130.

At this time, the controller 130 may control operations 1301 and 1302 by referring to the first to third information stored in the information storage 530.

That is, the controller 130 may check the first to third information stored in the information storage 530, enter the automatic exclusive mode when the preset size of write data are transferred from the host 102 and written to the nonvolatile memory 150 through operation 1306 of operation 1302 in the start period of the automatic exclusive mode through operation 1301, which can be recognized through the check result, and exit from the automatic exclusive mode at a point of time that a preset time has elapsed from the entry point of the automatic exclusive mode through operation 1307 of operation 1302.

Specifically, the controller 130 may check whether the automatic exclusive mode was already started, by referring to the first information stored in the information storage 530.

When the check result indicates that the automatic exclusive mode is not started or the automatic exclusive mode was ended, the controller 130 may perform operation 1301 to select whether to start the automatic exclusive mode. On the other hand, the controller 130 may perform operation 1301 to continuously retain the end state of the automatic exclusive mode.

When the check result indicates that the automatic exclusive mode was started, the controller 130 may perform operation 1301 to determine whether to end the automatic exclusive mode. On the other hand, the controller 130 may perform operation 1301 to continuously retain the automatic exclusive mode.

When the result obtained by checking the first information stored in the information storage 530 indicates that the automatic exclusive mode was started, the controller 130 may check the entry/exit states and entry/exit points (i.e., time points) of the automatic exclusive mode by referring to the second and third information. For example, the controller 130 may check the second information of the information storage 530 in the start period of the automatic exclusive mode. When the check result indicates that the controller 130 exited from the automatic exclusive mode, the controller 130 may check the size of write data corresponding to write commands stored in the command queue 512, and check a time point of when the automatic exclusive mode was entered. Similarly, the controller 130 may check the second information stored in the information storage 530 in the start period of the automatic exclusive mode. When the check result indicates that the controller 130 entered the automatic exclusive mode, the controller 130 may check the third information stored in the information storage 530 and check a time point of when the automatic exclusive mode was exited.

The controller 130 may adjust the values of the first to third information stored in the information storage 530, in response to the result obtained by checking the state of the nonvolatile memory 150.

Specifically, the controller 130 may adjust the value of the first information stored in the information storage 530 according to the result obtained by checking the state of the nonvolatile memory 150 as described above at operation 1301. The controller 130 may determine whether to start/end the automatic exclusive mode. By way of example and not limitation, when the controller 130 needs to start the automatic exclusive mode according to the result obtained by checking the ratio of free memory blocks among the memory blocks BLOCK<1:6> included in the nonvolatile memory 150, the controller 130 may set the first information stored in the information storage 530 to the start state. Similarly, when the controller 130 needs to end the automatic exclusive mode according to the result obtained by checking the ratio of free memory blocks among the memory blocks BLOCK<1:6> included in the nonvolatile memory 150, the controller 130 may set the first information stored in the information storage 530 to the end state.

According to the result obtained by checking the state of the nonvolatile memory 150 in the start period of the automatic exclusive mode, the controller 130 may adjust the value of the second or third information stored in the information storage 530.

Specifically, when entering the automatic exclusive mode to perform a merge operation through operation 1306 of operation 1302 in the start period of the automatic exclusive mode, the controller 130 may adjust the value of the second or third information stored in the information storage 530 according to a result obtained by checking the total number of valid pages included in victim memory blocks among the memory blocks BLOCK<1:6> included in the nonvolatile memory 150.

During the merge operation, when the total number of valid pages included in the victim memory blocks among the memory blocks BLOCK<1:6> included in the nonvolatile memory 150 is equal to or more than a preset number, the controller 130 may decrease the preset size contained in the second information stored in the information storage 530, such that the entry into the automatic exclusive mode through operation 1306 is more frequently repeated.

During the merge operation, when the total number of valid pages included in the victim memory blocks among the memory blocks BLOCK<1:6> included in the nonvolatile memory 150 is less than the preset number, the controller 130 may increase the preset size contained in the second information stored in the information storage 530, such that the entry into the automatic exclusive mode through operation 1306 is less frequently repeated.

During the merge operation, when the total number of valid pages included in the victim memory blocks among the memory blocks BLOCK<1:6> included in the nonvolatile memory 150 is equal to or more than the preset number, the controller 130 may increase the preset length contained in the third information stored in the information storage 530, such that the time interval from the entry point of the automatic exclusive mode through operation 1306 to the exit point of the automatic exclusive mode through operation 1307 is increased.

During the merge operation, when the total number of valid pages included in the victim memory blocks among the memory blocks BLOCK<1:6> included in the nonvolatile memory 150 is less than the preset number, the controller 130 may decrease the preset length contained in the third information stored in the information storage 530, such that the time interval from the entry point of the automatic exclusive mode through operation 1306 to the exit point of the automatic exclusive mode through operation 1307 is decreased.

For reference, the controller 130 may adjust only the second or third information or both of the second and third information stored in the information storage 530 through one adjusting operation. The adjusting operation of the controller 130 to adjust the second or third information stored in the information storage 530 may vary depending on design.

In the above-described embodiment, 'preset ratio' and 'preset number' have been exemplified as reference values for adjusting the first to third information stored in the information storage 530. However, the values are only examples, and more types of reference values can be used. For example, 'first to N ratios' and 'first to M numbers' can be used where N and M are natural numbers larger than 2.

As described above at operation 1304, the controller 130 may calculate the processing time of the write commands among the commands stored in the command queue 512 and the entry time of the entry period of the automatic exclusive mode, using the preset operation in the start period of the automatic exclusive mode through operation 1301.

Furthermore, as described above at operation 1305, the controller 130 may schedule the processing order of the commands stored in the command queue 512 according to the calculation result of operation 1304.

Specifically, the controller 130 may check the first to third information stored in the information storage 530. At this time, when the result obtained by checking the first information stored in the information storage 530 indicates that the automatic exclusive mode was started, the controller 130 may additionally check the second and third information stored in the information storage 530 to perform the preset operation. On the other hand, when the result indicates that the automatic exclusive mode was ended, the controller 130 may not check the second and third information stored in the information storage 530 and the preset operation may not be performed.

Therefore, when the result obtained by checking the first information stored in the information storage 530 indicates that the automatic exclusive mode was started, the controller 130 may compare the preset size recognized through the result obtained by checking the second information stored in the information storage 530 to the entire size of the write data corresponding to the write commands among the commands stored in the command queue 512, and calculate the number of entries into/exits from the automatic exclusive mode, which is required for processing the write commands stored in the command queue 512, as a processing number according to the comparison result.

The controller 130 may calculate the processing time of the write commands stored in the command queue 512 by multiplying the number of entries into/exits from the automatic exclusive mode, which is required for processing the write commands stored in the command queue 512, by the time required for writing the preset size of write data to the nonvolatile memory 150.

The controller 130 may calculate the entry time of the entry period of the automatic exclusive mode which is repeated while the write commands stored in the command queue 512 are processed, by multiplying the number of entries into/exits from the automatic exclusive mode, which is required for processing the write commands stored in the command queue 512, by the preset time which can be recognized as the result obtained by checking the third information stored in the information storage 530.

The controller 130 may calculate a write time required for processing the write commands stored in the command queue 512 by adding the processing time of the write commands stored in the command queue 512 and the entry time of the entry period of the automatic exclusive period which is repeated while the write commands stored in the command queue 512 are processed.

The controller 130 may calculate an available processing time of the other commands excluding the write commands among the commands stored in the command queue 512 by subtracting the write time required for processing the write commands stored in the command queue 512 from a timeout time of the write command stored in the command queue 512. The timeout time of the write commands stored in the command queue 512 may be preset through the specification of the memory system 110. The timeout time may be decided based on a write command which is first inputted and stored among a plurality of write commands stored in the command queue 512.

The controller 130 may preferentially process the other commands stored in the command queue 512 until the available processing time. After the available processing time, the controller 130 may preferentially process the write commands stored in the command queue 512.

For example, suppose that the preset size contained in the second information stored in the information storage 530 is 128 Kbyte. Furthermore, assuming that the number of write commands stored in the command queue 512 is 10 and the size of write data corresponding to one write command is 256 Kbyte, the entire size of write data corresponding to the write commands stored in the command queue 512 may correspond to 2,560 Kbyte. Furthermore, suppose that a time required for writing write data having the preset size of 128 Kbyte to the nonvolatile memory 150 is 1 ms, the preset time contained in the third information of the information storage 530 is 100 ms, and the timeout time of the write commands stored in the command queue 512 is 5,000 ms.

In this state, the controller 130 may compare the preset size of 128 Kbyte to the entire size (2,560 Kbyte) of the write data corresponding to the write commands stored in the command queue 512, and determine that the controller 130 needs to enter/exit from the automatic exclusive mode a total of 20 times in order to process the write commands stored in the command queue 512.

That is, when the controller 130 writes the entire write data (2,560 Kbyte) corresponding to the write commands stored in the command queue 512 to the nonvolatile memory 150 according to operations 1306, 1307 of operation 1302, the controller 130 needs to enter/exit from the automatic exclusive mode at each preset size of 128 Kbyte. Therefore, in order to write the entire write data (2,560 Kbyte) corresponding to the write commands stored in the command queue 512 to the nonvolatile memory 150, the controller 130 needs to enter/exit from the automatic exclusive mode a total of 20 times.

The controller 130 may multiply the time required for writing the preset size (128 Kbyte) of write data to the nonvolatile memory 150 by the processing number (1 ms×20 times). The controller 130 may determine that the time required for processing the write commands stored in the command queue 512 is 20 ms.

The controller 130 may multiply the preset time of 100 ms corresponding to the entry period of the automatic exclusive mode by the calculated processing number of 20 times (100 ms×20 times). The controller 130 may determine that the entry time of the entry period of the automatic exclusive mode which is repeated while the write commands stored in the command queue 512 are processed is a total of 2,000 ms.

The controller 130 may add the processing time (20 ms) of the write commands stored in the command queue 512 and the entry time (2,000 ms) of the entry period of the automatic exclusive period which is repeated while the write commands stored in the command queue 512 are processed (20 ms+2,000 ms). The controller 130 may determine that the write time required for processing the write commands stored in the command queue 512 is 2,020 ms.

The controller 130 may subtract the write time (2,020 ms) required for processing the write commands stored in the command queue 512 from the timeout time (5,000 ms) of the write command stored in the command queue 512 (5,000 ms-2,020 ms). The controller 130 may determine that the available processing time of the other commands except the write commands among the commands stored in the command queue 512 is 3,980 ms.

The controller 130 may preferentially process the other commands excluding the write commands among the commands stored in the command queue 512 until the available processing time of 3,980 ms. After the available processing time, the controller 130 may preferentially process the write commands among the commands stored in the command queue 512 for residual 2,020 ms until the write timeout of 5,000 ms.

The other commands excluding the write commands among the commands stored in the command queue 512 may representatively indicate read commands. Depending on design, however, the other commands may indicate other commands.

Therefore, the controller 130 can avoid or prevent a delay of a read command requested from the host 102 by an entry into/exit from the automatic exclusive mode in the start period of the automatic exclusive mode as much as possible, and simultaneously prevent a write command from being discarded when the write command is not processed until the timeout.

As illustrated in FIG. 5, the controller 130 may include the processor 134. The processor 134 may include a host controller 510 and a memory controller 520. Therefore, operations 1301 to 1308 of the controller 130 may be narrowed to operations of the host controller 510 and the memory controller 520 which are included in the processor 134 of the controller 130. However, the configuration in which operations 1301 to 1308 of the controller 130 are narrowed to the operations of the host controller 510 and the memory controller 520 included in the processor 134 of the controller 130 is only an example, and operations 1301 to 1308 of the controller 130 can be implemented through various other components, depending on design.

The host controller 510 may include the command queue 512. The host controller 510 may process an operation between the host 102 and the host controller 510. For example, referring to FIG. 1, the host controller 510 and the memory controller 520 may be included in the processor 134 and coupled to each other. The host controller 510 may process an operation between the host 102 and the host controller 510 through the host interface 132.

The memory controller 520 may be coupled to the host controller 510. The memory controller 520 may process an operation between the nonvolatile memory 150 and the memory controller 520.

For example, referring to FIG. 1, the memory controller 520 and the host controller 510 may be included in the processor 134 and coupled to each other. The memory controller 520 may process an operation between the nonvolatile memory 150 and the memory controller 520 through the memory interface 142.

As illustrated in FIGS. 6 and 7, operations 1301 to 1308 of the controller 130 may be described in more detail by describing the operations of the host controller 510 and the memory controller 520 which are included in the processor 134 of the controller 130.

Specifically, referring to FIG. 6, the host controller 510 may check the first to third information stored in the information storage 530 at operation 5101.

The host controller 510 may switch the state of the memory system 110 to a busy state in response to an entry into the automatic exclusive mode in the start period of the automatic exclusive mode, which can be recognized by checking the first to third information stored in the information storage 530 through operation 5101. The host controller 510 may inform the host 102 of the switched state, at operation 5108.

Since the host 102 recognizes through operation 5108 of the host controller 510 that the memory system 110 is busy, the host controller 510 may not receive an arbitrary request such as a read request or a write request entered from the host 102 in the entry period of the automatic exclusive mode.

The host controller 510 may switch the state of the memory system 110 to a ready state in response to an exit from the automatic exclusive mode in the start period of the automatic exclusive mode, which can be recognized by checking the first to third information stored in the information storage 530 through operation 5101. The host controller 510 may inform the host 102 of the switched state, at operation 5109.

Since the host 102 recognizes through operation 5109 of the host controller 510 that the memory system 110 is ready, the host controller 510 may receive an arbitrary request such as a read request or a write request entered from the host 102 after exiting from the automatic exclusive mode.

The host controller 510 can check the values of the first to third information stored in the information storage 530 through operation 5101. However, the host controller 510 may not adjust the values of the first to third information stored in the information storage 530. That is, only the memory controller 520 may have an authority to adjust the values of the first to third information stored in the information storage 530.

When the result obtained by checking the first information of the information storage 530 indicates that the automatic exclusive mode was started, the host controller 510 may additionally check the second and third information to perform the preset operation described at operation 1304. On the other hand, when the result indicates that the automatic exclusive mode was ended, the host controller 510 may not check the second and third information so that the preset operation may be not performed.

Therefore, when the result obtained by checking the first information stored in the information storage 530 indicates that the automatic exclusive mode was started, the host controller 510 may compare the preset size recognized by checking the second information stored in the information storage 530 to the entire size of write data corresponding to the write commands among the commands stored in the command queue 512. Then, the host controller 510 may calculate the number of entries into/exits from the automatic exclusive mode, which is required for processing the write commands stored in the command queue 512, as the processing number according to the comparison result, at operation 5102.

The host controller 510 may calculate the processing time of the write commands stored in the command queue 512 by multiplying the processing number calculated through operation 5102 by the time required for writing the preset size of write data to the nonvolatile memory 150, at operation 5103.

The host controller 510 may calculate the entry time of the entry period of the automatic exclusive mode which is repeated while the write commands stored in the command queue 512 are processed, by multiplying the processing number calculated through operation 5102 by the preset time which can be recognized by checking the third information of the information storage 530, at operation 5104.

The host controller 510 may calculate a write time required for processing the write commands stored in the command queue 512 by adding the processing time of the write commands stored in the command queue 512 at operation 5103 and the entry time of the entry period of the automatic exclusive period which is repeated while the write commands stored in the command queue 512 are processed at operation 5104, at operation 5105.

The host controller 510 may calculates an available processing time of the other commands excluding the write commands among the commands stored in the command queue 512 by subtracting the write time required for processing the write command stored in the command queue 512 at operation 5105 from the timeout time of the write commands stored in the command queue 512, at operation 5106. The timeout time of the write commands stored in the command queue 512 may be preset through the specification of the memory system 110. The timeout time may be decided based on the write command which is first inputted and stored among the plurality of write commands stored in the command queue 512.

The host controller 510 may preferentially process the other commands stored in the command queue 512 until the available processing time calculated through operation 5106. After the available processing time, the host controller 510 may preferentially process the write commands stored in the command queue 512.

For example, suppose that the preset size contained in the second information of the information storage 530 is 128 Kbyte. Furthermore, when it is assumed that the number of write commands stored in the command queue 512 is 10 and the size of write data corresponding to one write command is 256 Kbyte, the entire size of write data corresponding to the write commands stored in the command queue 512 may correspond to 2,560 Kbyte. Furthermore, suppose that the time required for writing write data having the preset size of 128 Kbyte to the nonvolatile memory 150 is 1 ms, the preset time contained in the third information stored in the information storage 530 is 100 ms, and the timeout time of the write commands stored in the command queue 512 is 5,000 ms.

In this state, as described above at operation 5102, the host controller 510 may compare the preset size of 128 Kbyte to the entire size (2,560 Kbyte) of the write data corresponding to the write commands stored in the command queue 512. The host controller 510 may determine that the host controller 510 needs to enter/exit from the automatic exclusive mode a total of 20 times in order to process the write commands stored in the command queue 512.

That is, when the host controller 510 writes the entire write data (2,560 Kbyte) corresponding to the write commands stored in the command queue 512 to the nonvolatile memory 150 as described above at operations 1306 and 1307 of operation 1302, the host controller 510 needs to enter/exit from the automatic exclusive mode at each preset size of 128 Kbyte. Therefore, in order to process the entire write data (2,560 Kbyte) corresponding to the write commands stored in the command queue 512 to the nonvolatile memory 150 through the memory controller 520, the host controller 510 needs to enter/exit from the automatic exclusive mode by a total of 20 times.

The host controller 510 may multiply the time required for writing the preset size (128 Kbyte) of write data to the nonvolatile memory 150 by the processing number (1 ms×20 times) as described above at operation 5103. The host controller 510 may determine that the time required for processing the write commands stored in the command queue is 20 ms.

The host controller 510 may multiply the preset time of 100 ms corresponding to the entry period of the automatic exclusive mode by the calculated processing number of 20 times (100 ms×20 times) as described above at operation 5103. The host controller 510 may determine that the entry time of the entry period of the automatic exclusive mode which is repeated while the write commands stored in the command queue 512 are processed is a total of 2,000 ms.

As described above at operation 5105, the host controller 510 may add the processing time (20 ms) of the write commands stored in the command queue 512 and the entry time (2,000 ms) of the entry period of the automatic exclusive period which is repeated while the write commands stored in the command queue 512 are processed (20 ms+2,000 ms). The host controller 510 may determine that the write time required for processing the write commands stored in the command queue 512 is 2,020 ms.

As described above at operation 5106, the host controller 510 may subtract the write time (2,020 ms) required for processing the write commands stored in the command queue 512 from the timeout time (5,000 ms) of the write commands stored in the command queue 512 (5,000 ms-2,020 ms), The host controller 510 may determine that the available processing time of the other commands except the write commands among the commands stored in the command queue 512 is 3,980 ms.

As described above at operation 5107, the host controller 510 may preferentially process the other commands except the write commands among the commands stored in the command queue 512 until the available processing time of 3,980 ms. After the available processing time, the host controller 510 may preferentially process the write commands among the commands stored in the command queue 512 for residual 2,020 ms until the write timeout of 5,000 ms.

The other commands excluding the write commands among the commands stored in the command queue 512 may representatively indicate read commands. Depending on a designer's selection, however, the other commands may indicate other commands.

Therefore, the host controller 510 can avoid or prevent a delay of a read command requested from the host 102 by an entry into/exit from the automatic exclusive mode in the start period of the automatic exclusive mode as much as possible, and simultaneously prevent a write command from being discarded when the write command is not processed until the timeout.

Referring to FIG. 7, the memory controller 520 may check the first to third information stored in the information storage 530 at operation 5203.

The memory controller 520 may write data corresponding to a write command stored in the command queue 512 to the nonvolatile memory 150 according to a request of the host controller 510 at the exit period of the automatic exclusive mode in the start period of the automatic exclusive mode, which can be recognized in response to a result obtained by checking the first to third information stored in the information storage 530 through operation 5203, that is, after exiting from the automatic exclusive mode through operation 5206 which will be described later, at operation 5204.

The memory controller 520 may enter the automatic exclusive mode by adjusting the second information stored in the information storage 530, when the size of the write data written to the nonvolatile memory 150 through operation 5204 becomes the preset size which can be recognized through operation 5203 at the exit period of the automatic exclusive mode in the start period of the automatic exclusive mode, which can be recognized through the result obtained by checking the first to third information stored in the information storage 530 through operation 5203, that is, after exiting from the automatic exclusive mode through operation 5206 which will be described later, at operation 5205.

The memory controller 520 may exit from the automatic exclusive mode by adjusting the second information stored in the information storage 530 at a point of time that the preset time recognized through operation 5203 has elapsed from the entry period of the automatic exclusive mode in the start period of the automatic exclusive mode, which can be recognized through the result obtained by checking the first to third information stored in the information storage 530 through operation 5203, that is, the point of time that the memory controller 520 entered the automatic exclusive mode through operation 5205, at operation 5206.

The memory controller 520 may check the state of the nonvolatile memory 150 at operation 5201. At this time, the operation of checking the state of the nonvolatile memory 150 may include an operation of checking the ratio of free memory blocks among the memory blocks BLOCK<1:6> included in the nonvolatile memory 150.

In the embodiment, the operation of checking the ratio of free memory blocks among the memory blocks BLOCK<1:6> included in the nonvolatile memory 150 at operation 5201 may be exemplified as the operation of checking the state of the nonvolatile memory 150. However, this is only an example, and the state of the nonvolatile memory 150 can be checked through another method.

The memory controller 520 may adjust the first to third information of the information storage 530 according to the check result of operation 5201, to adjust information on whether to start/exit the automatic exclusive mode and the entry and exit points of the automatic exclusive mode, at operation 5202.

Specifically, the memory controller 520 may check the ratio of free memory blocks among the memory blocks BLOCK<1:6> included in the nonvolatile memory 150 through operation 5201. The memory controller 520 may adjust the first information stored in the information storage 530 through operation 5202 according to the check result, thereby selecting whether to start/exit the automatic exclusive mode.

When the check result indicates that the ratio of free memory blocks is equal to or less than the preset ratio, the memory controller 520 continue to be in the automatic exclusive mode if the automatic exclusive mode was already started, or start the automatic exclusive mode if the automatic exclusive mode was ended.

On the other hand, when the check result indicates that the ratio of free memory blocks exceeds the preset ratio, the memory controller 520 can retain end state the automatic exclusive mode when the automatic exclusive mode was already started, or retain the end state of the automatic exclusive mode when the automatic exclusive mode was ended.

When entering the automatic exclusive mode to perform a merge operation after starting the automatic exclusive mode according to the check result of operation 5201, the memory controller 520 may check the total number of valid pages included in victim memory blocks among the memory blocks BLOCK<1:6> included in the nonvolatile memory 150 through operation 5201, based on the preset number. The memory controller 520 may adjust the value of the second or third information stored in the information storage 530 through operation 5202, according to the check result.

During the merge operation, when the total number of valid pages included in the victim memory blocks among the memory blocks BLOCK<1:6> included in the nonvolatile memory 150 is equal to or more than a preset number, the memory controller 520 may decrease the preset size contained in the second information stored in the information storage 530, such that the entry into the automatic exclusive mode through operation 5205 is more frequently repeated.

During the merge operation, when the total number of valid pages included in the victim memory blocks among the memory blocks BLOCK<1:6> included in the nonvolatile memory 150 is less than the preset number, the memory controller 520 may increase the preset size contained in the second information stored in the information storage 530, such that the entry into the automatic exclusive mode through operation 5205 is less frequently repeated.

During the merge operation, when the total number of valid pages included in the victim memory blocks among the memory blocks BLOCK<1:6> included in the nonvolatile memory 150 is equal to or more than the preset number, the memory controller 520 may increase the preset length contained in the third information stored in the information storage 530, such that the time interval from the entry point of the automatic exclusive mode through operation 5205 to the exit point of the automatic exclusive mode through operation 5206 is increased.

During the merge operation, when the total number of valid pages included in the victim memory blocks among the memory blocks BLOCK<1:6> included in the nonvolatile memory 150 is less than the preset number, the memory controller 520 may decrease the preset length contained in the third information stored in the information storage 530, such that the time interval from the entry point of the automatic exclusive mode through operation 5205 to the exit point of the automatic exclusive mode through operation 5206 is decreased.

For reference, the memory controller 520 may adjust only the second or third information or both of the second and third information stored in the information storage 530 through one adjusting operation. The adjusting operation of the memory controller 520 to adjust the second or third information stored in the information storage 530 may be changed depending on design.

The memory controller 520 may flush data stored in the volatile memory 144 to the nonvolatile memory 150 in response to the entry into the automatic exclusive mode in the start period of the automatic exclusive mode through operations 5202 and 5205.

In this case, the memory controller 520 may exclusively use the entire region of the volatile memory 144 to perform a merge operation during the entry period of the automatic exclusive mode.

At this time, the operation of flushing the data stored in the volatile memory 144 to the nonvolatile memory 150 may indicate that all of the data stored in the volatile memory 144 are copied and stored into a preset region of the nonvolatile memory 150. After the flush operation, all data in the volatile memory 144 are no longer necessary to be retained so that the memory controller 520 may discard all of the data stored in the volatile memory 144. Then, the memory controller 520 may exclusively use the entire region of the volatile memory 144, which is allocated for storing data, to perform a merge operation.

Furthermore, the memory controller 520 may discard data updated into the nonvolatile memory 150 among the data stored in the volatile memory 144, in response to the entry into the automatic exclusive mode in the start period of the automatic exclusive mode through operations 5202 and 5205.

In this case, the memory controller 520 may exclusively use a wider region than a region designated for a general merge operation in the volatile memory 144, to perform the merge operation during the entry period of the automatic exclusive mode.

As described above with reference to FIG. 1, the volatile memory 144 can be used for various uses, for example, a write buffer/cache, a read buffer/cache and a map buffer/cache. Therefore, the internal storage space of the volatile memory 144 may be divided into various regions depending on the uses. Thus, a part of the internal storage region of the volatile memory 144 may be previously designated for a merge operation.

At this time, the memory controller 520 in accordance with the embodiment may discard data updated into the nonvolatile memory 150 among data stored in a region which is not designated for a merge operation in the storage space of the volatile memory 144, in response to the entry into the automatic exclusive mode in the start period of the automatic exclusive mode through operations 5202 and 5205. Therefore, the memory controller 520 in accordance with the embodiment can exclusively use a wider region than a region designated for a general merge operation in the volatile memory 144, to perform the merge operation during the entry period of the automatic exclusive mode.

The data updated into the nonvolatile memory 150 among the data stored in the volatile memory 144 may indicate data which have been already stored into the nonvolatile memory 150 through an operation such as a checkpoint, among the data stored in the nonvolatile memory 144. For this reason, the memory controller 520 can discard the data updated into the nonvolatile memory 150 among the data stored in the volatile memory 144 in the entry period of the automatic exclusive mode, and then use the corresponding region (i.e., previously storing discarded data and now ready to be allocated) for a merge operation.

FIGS. 8 to 16 are diagrams schematically illustrating application examples of the data processing system of FIG. 1.

Figure 8:
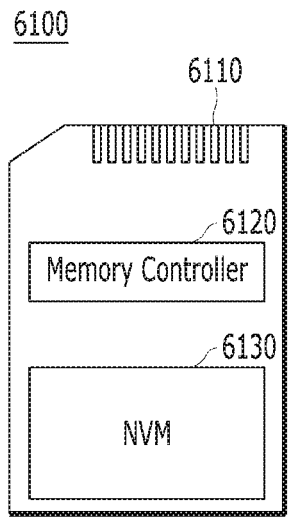
FIGS. 8 to 16 are diagrams schematically illustrating application examples of the data processing system shown in FIG. 1 in accordance with various embodiments of the present invention.

FIG. 8 is a diagram schematically illustrating an example of the data processing system including the memory system in accordance with the present embodiment. FIG. 8 schematically illustrates a memory card system to which the memory system in accordance with the present embodiment is applied.

Referring to FIG. 8, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By way of example and not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processing unit, a host interface, a memory interface and an error correction component. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device under one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and a universal flash storage (UFS).

Figure 9:
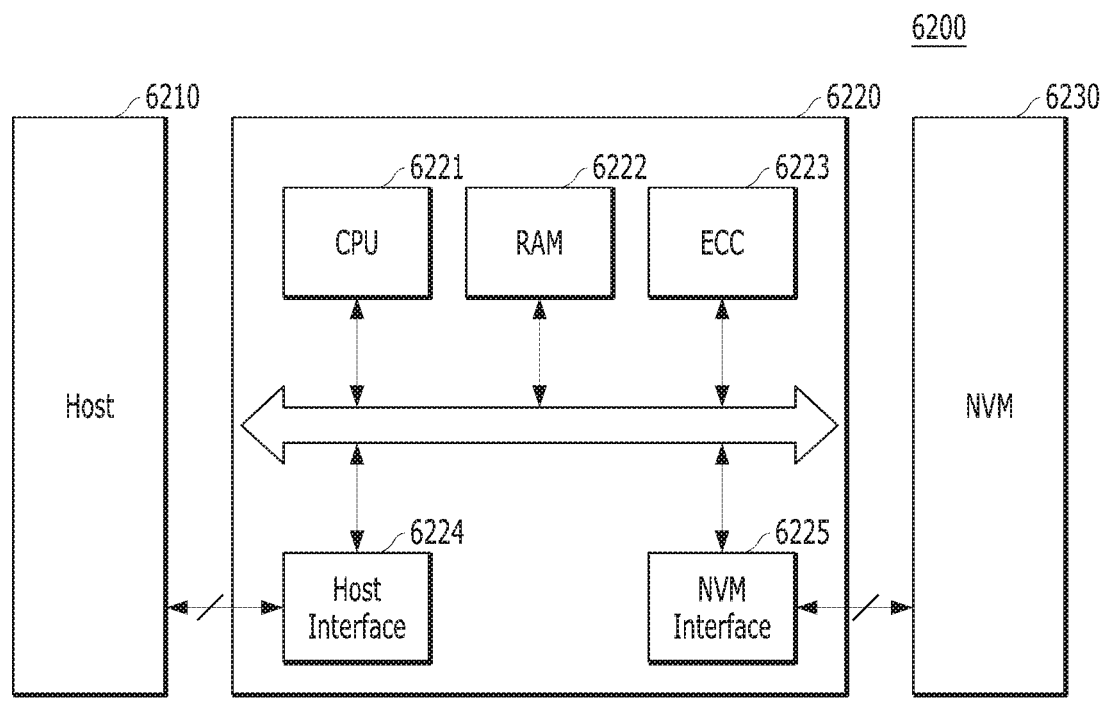

FIG. 9 is a diagram schematically illustrating an example of the data processing system including the memory system in accordance with the embodiment.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. Particularly, as the memory controller 6220 is configured to communicate with the external device through one or more of various communication protocols, the memory system and the data processing system in accordance with the present embodiment may be applied to wired/wireless electronic devices or particularly a mobile electronic device.

Figure 10:
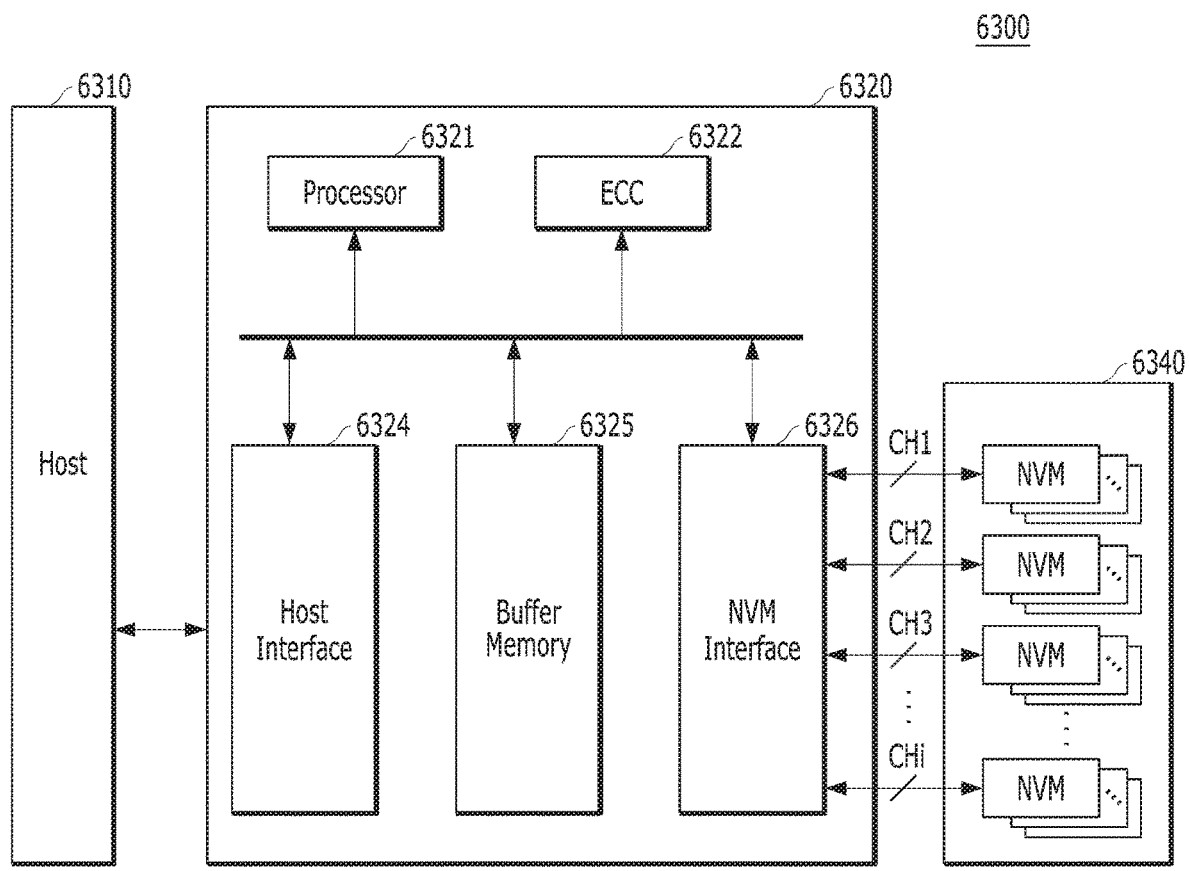

FIG. 10 is a diagram schematically illustrating an example of the data processing system including the memory system in accordance with the embodiment. FIG. 10 schematically illustrates an SSD to which the memory system in accordance with the embodiment is applied.

Referring to FIG. 10, the SSD 6300 may include a controller 6320 and a memory device 6340 including a plurality of nonvolatile memories. The controller 6320 may correspond to the controller 130 in the memory system 110 of FIGS. 1 and 5. The memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 9 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 11:
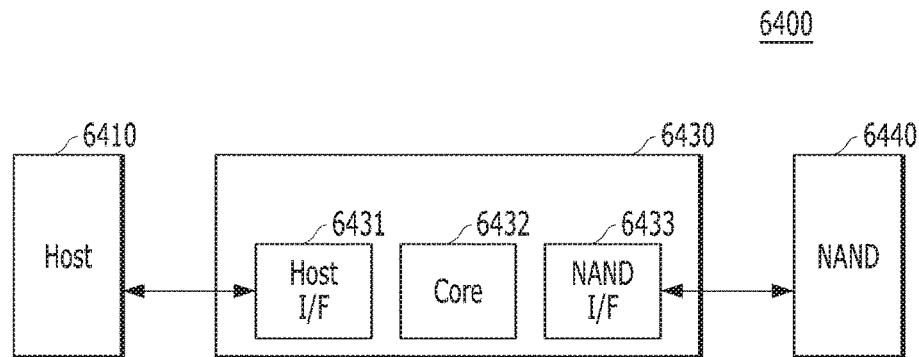

FIG. 11 is a diagram schematically illustrating an example of the data processing system including the memory system in accordance with the embodiment. FIG. 11 schematically illustrates an embedded Multi-Media Card (eMMC) to which the memory system in accordance with the embodiment is applied.

Referring to FIG. 11, the eMMC 6400 may include a controller 6430 and a memory device 6440 embodied by one or more NAND flash memories. The controller 6430 may correspond to the controller 130 in the memory system 110 of FIGS. 1 and 5. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 12 to 15 are diagrams schematically illustrating other examples of the data processing system including the memory system in accordance with the embodiment. FIGS. 12 to 15 schematically illustrate UFS (Universal Flash Storage) systems to which the memory system in accordance with the embodiment is applied.

Referring to FIGS. 12 to 15, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 9 to 11, and the UFS cards 6530, 6630, 6730, 6830 may be embodied in the form of the memory card system 6100 described with reference to FIG. 8.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 12:
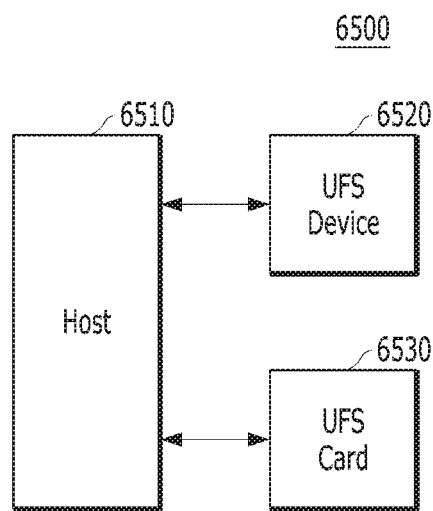

In the UFS system 6500 illustrated in FIG. 12, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410. The form of a star is a sort of arrangements where a single centralized component is coupled to plural devices for parallel processing. A plurality of UFS cards may be connected in parallel or in the form of a star to the UFS device 6520 or connected in series or in the form of a chain to the UFS device 6520.

Figure 13:
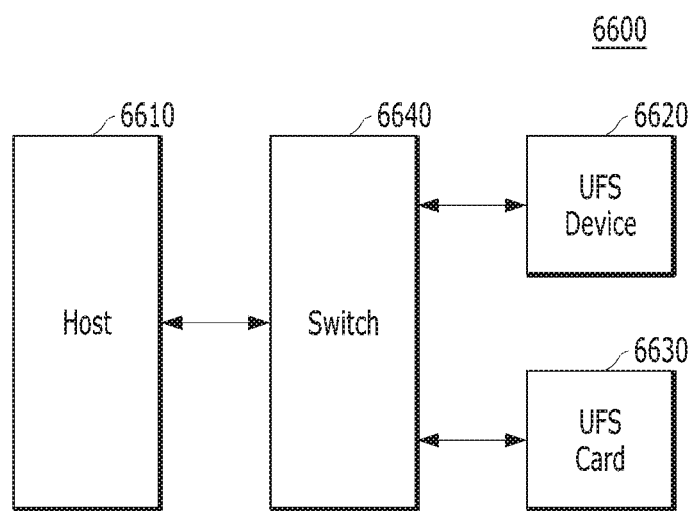

In the UFS system 6600 illustrated in FIG. 13, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 14:
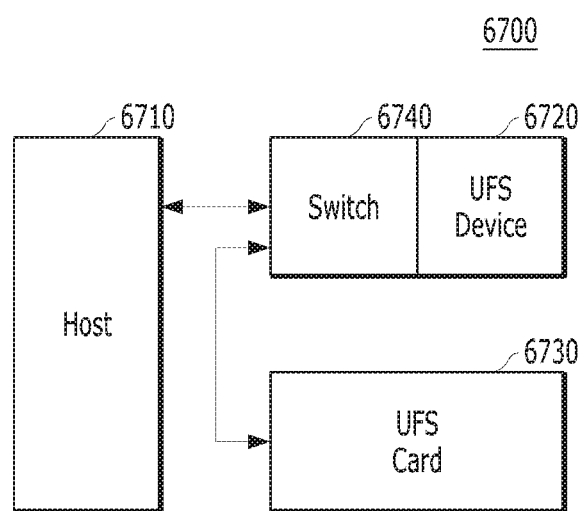

In the UFS system 6700 illustrated in FIG. 14, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 15:
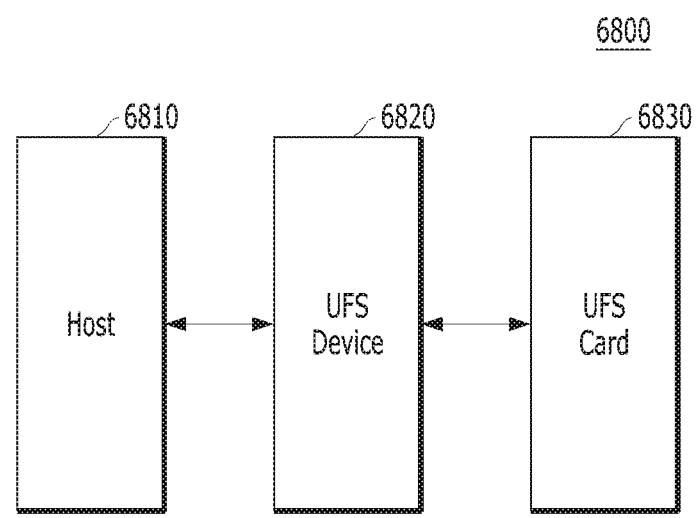

In the UFS system 6800 illustrated in FIG. 15, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 16:
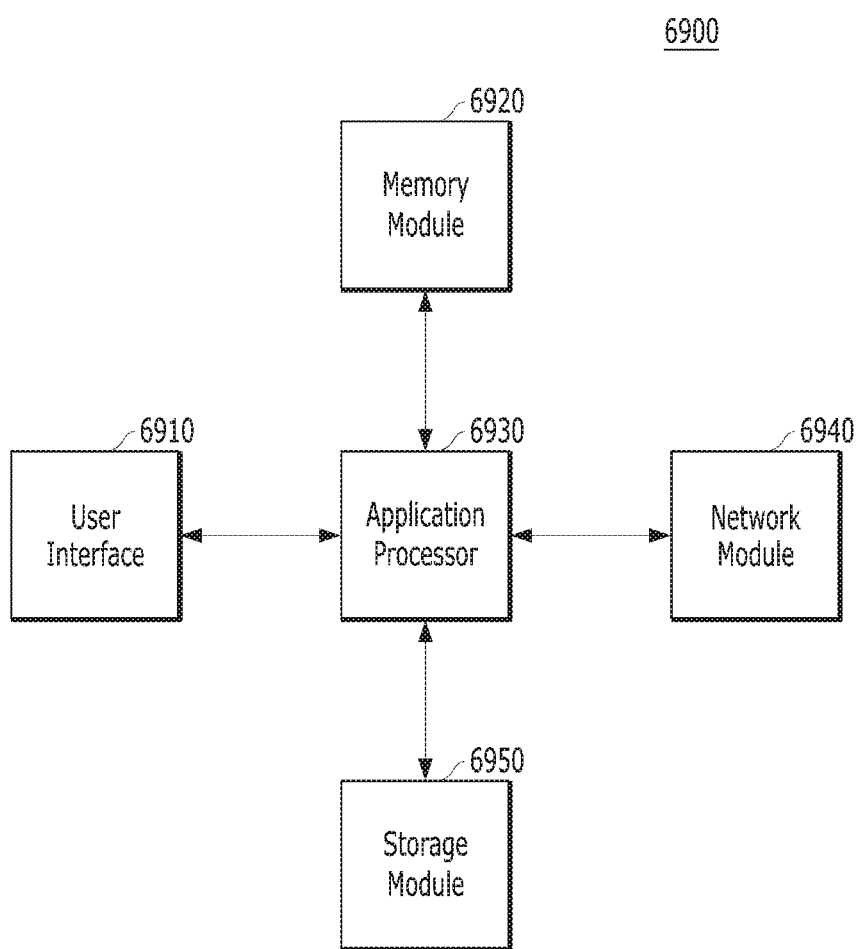

FIG. 16 is a diagram schematically illustrating an example of the data processing system including the memory system in accordance with an embodiment. FIG. 16 is a diagram schematically illustrating a user system to which the memory system in accordance with the embodiment is applied.

Referring to FIG. 16, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, an eMMC and an UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. Further, the user interface 6910 may support a function of receiving data from the touch panel.

In accordance with the present embodiment, the memory system can allow an exclusive use of the nonvolatile memory in order to perform a merge operation in the entry period of the automatic exclusive mode, thereby maximizing the performance of the merge operation.

At this time, the memory system may select whether to start/exit the automatic exclusive mode in response to a request of the host or a result obtained by checking the state of the nonvolatile memory. The memory system may automatically repeat the exit into/exit from the automatic exclusive mode every predetermined cycle in the start period of the automatic exclusive mode. Through these operations, the memory system can accurately adjust the entry/exit points of the automatic exclusive mode.

Furthermore, the memory system can calculate the performance time of the entry/exit operation of the automatic exclusive mode, which is repeated in the start period of the automatic exclusive mode. The memory system can schedule a processing order of normal commands (for example, read and write commands) requested from the host. Through this operation, the memory system can avoid a timeout of the normal commands requested from the host by the entry into/exit from the automatic exclusive mode, which is repeated in the start period of the automatic exclusive mode.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a nonvolatile memory;
   a volatile memory;
   an information storage configured to store an information related to a mode;
   a memory controller configured to enter the mode for performing a merge operation in the nonvolatile memory, when size of a write data transferred from a host is a predetermined size that depends on the information stored in the information storage; and a host controller coupled to the memory controller, and configured to calculate a processing time of write commands related to the write data among commands stored in a command queue and schedule a processing order of the commands stored in the command queue according to a result of calculation that depends on the information stored in the information storage, wherein the memory controller exclusively uses the volatile memory for performing the merge operation in the nonvolatile memory when entering the mode.

2. The memory system of claim 1, wherein the information storage configured to store first information indicating the start/end states of the mode, second information indicating the entry/exit points of the mode and the predetermined size, and third information indicating a preset time.

3. The memory system of claim 2,
wherein the host controller checks the first to third information of the information storage in the start period of the mode recognized through the check result, and compares the predetermined size stored in the information storage to size of the write data corresponding to the write commands stored in the command queue.

4. The memory system of claim 3, wherein the host controller calculates the number of entries of mode from the write commands stored in the command queue as a processing number, and calculates a processing time using the processing number and a time required for writing the predetermined size of write data to the nonvolatile memory.

5. The memory system of claim 4, wherein the host controller calculates an entry time of the mode by multiplying the processing number by the preset time recognized through the check result, calculates a write time by adding the processing time and entry time, and calculates a processing of other commands by subtracting the write time from a timeout time.

6. The memory system of claim 5, wherein the host controller schedules the processing order of the commands stored in the command queue processing the other commands until the timeout time with preventing the write commands from being discarded.

7. The memory system of claim 1, wherein the host controller informs the host of a signal indicating a busy state in response to the state of the mode from the information storage.

8. The memory system of claim 1, wherein the memory controller adjusts the information on whether to start/end the mode and the entry/exit points of the mode by adjusting the first to third information stored in the information storage in response to the result obtained by checking the state of the nonvolatile memory.

9. The memory system of claim 8, wherein the memory controller checks the first to third information of the information storage, writes the write data to the nonvolatile memory according to a request of the host controller in the start period of the mode recognized through the check result, enters the mode by adjusting the second information of the information storage when the write data corresponding to the predetermined size recognized through the check result are written to the nonvolatile memory, and exits from the mode by adjusting the second information of the information storage at a time point when the preset time recognized through the check result has elapsed from the entry point of the mode.

10. An operation method of a memory system which comprises a memory controller, a host controller, a nonvolatile memory, a volatile memory, and an information storage for storing an information related to a mode, the operation method comprising:

repeatedly entering the mode for performing a merge operation in the nonvolatile memory, when size of a write data transferred from a host is a predetermined size that depends on the information of the information storage, calculating a processing time of write commands related to the write data among commands stored in a command queue and then scheduling a processing order of the commands stored in the commands queue according to the calculation result that depends on the information stored in the information storage, and exclusively using the volatile memory to perform the merge operation in the nonvolatile memory when entering the mode.

11. The operation method of claim 10, wherein the information storage configured to store first information indicating the start/end states of the mode, second information indicating the entry/exit points of the mode and the predetermined size, and third information indicating a preset time.

12. The operation method of claim 11, wherein the calculating the processing time comprises:

checking the first to third information of the information storage in the start period of the mode recognized thorough the check result, and comparing the predetermined size in the information storage to size of the write data corresponding to the write commands stored in the command queue.

13. The operation method of claim 12, wherein the calculating the processing time further comprises:

a first calculation step in which the host controller calculates the number of entries from the write commands stored in the command queue as a processing number; and a second calculation step in which the host controller calculates a processing time using the processing number and a time required for writing the predetermined size of write data to the nonvolatile memory.

14. The operation method of claim 13, wherein the calculating the processing time further comprises a third calculation step in which the host controller calculates an entry time of the mode by multiplying the processing number by the preset time recognized through the check result.

15. The operating method of claim 14, wherein the calculating the processing time further comprises:

a fourth calculation step in which the host controller calculates a write time by adding the processing time and entry time;

a fifth calculation step in which the host controller calculates a processing of other commands by subtracting the write time from a timeout time; and a processing step in which the host controller schedules the processing order of the commands stored in the command queue processing the other commands until the timeout time with preventing the write commands from being discarded.

16. The operation method of claim 12, wherein the repeatedly entering the mode comprises:

a second check step in which the host controller checks the first to third information stored in the information storage;

a first informing step in which the host controller informs the host of a signal indicating a busy state in response to the state of the mode from the information storage, recognized through the second check state; and a second informing step in which the host controller informs the host of a signal indicating a ready state in response to the state of the mode, recognized through the second check state.

17. The operation method of claim 12, wherein the repeatedly entering the mode comprises:

a third check step in which the memory controller checks the state of the nonvolatile memory; and an adjusting step in which the memory controller adjusts the information on whether to start/end the mode and the entry/exit points of the mode by adjusting the first to third information stored in the information storage in response to the result of the third check step.

18. The operation method of claim 17, wherein the repeatedly entering the mode further comprises a fourth check step in which the memory controller checks the first to third information of the information storage, the entry step comprises: writing, by the memory controller, the write data to the nonvolatile memory according to a write request transferred to the memory controller from the host controller in the start period of the mode, recognized through the result of the fourth check step; and entering, by the memory controller, the mode by adjusting the second information of the information storage when the memory controller writes the write data corresponding to the predetermined size recognized through the result of the fourth check step to the nonvolatile memory, and in the exit step, the memory controller exits from the mode by adjusting the second information of the information storage at a time point when the preset time recognized through the result of the fourth check step has elapsed from the entry point of the mode.

19. The memory system of claim 1, wherein the memory controller exclusively uses all or part region of the volatile memory for performing the merge operation in the nonvolatile memory when entering the mode.

20. The memory system of claim 19, wherein the part region of the volatile memory comprises a region which is stored a data updated into the nonvolatile memory and a region which is designated for the merge operation, among all region of the volatile memory.

21. The operation method of claim 10, wherein the exclusively using the volatile memory comprises:

exclusively using all region of the volatile memory to perform the merge operation in the nonvolatile memory when entering the mode, or exclusively using part region of the volatile memory to perform the merge operation in the nonvolatile memory when entering the mode.

22. The operation method of claim 21, wherein the part region of the volatile memory comprises a region which is stored a data updated into the nonvolatile memory and a region which is designated for the merge operation, among all region of the volatile memory.

* * * * *